United States Patent [19]

Rado

[11] Patent Number: 4,832,656
[45] Date of Patent: May 23, 1989

[54] POWER ROLL CONVEYOR WITH ADJUSTABLE TORQUE SENSITIVE COUPLING

[76] Inventor: Glenn T. Rado, 29804 Stockton, Farmington, Mich. 48024

[21] Appl. No.: 155,993

[22] Filed: Feb. 16, 1988

[51] Int. Cl.⁴ .............................................. F16D 7/02
[52] U.S. Cl. ....................................... 464/40; 198/781
[58] Field of Search .................... 198/781; 464/30, 40, 464/51, 57, 58, 59, 77

[56] References Cited

U.S. PATENT DOCUMENTS

| | | | |
|---|---|---|---|
| 3,208,303 | 9/1965 | Durouchoux | 464/40 X |
| 4,103,516 | 8/1978 | Marcin | 198/781 |
| 4,123,197 | 10/1978 | Keem et al. | 464/40 X |
| 4,327,563 | 5/1982 | Allmacher Jr. | 464/30 X |

FOREIGN PATENT DOCUMENTS 1147870  3/1985  U.S.S.R. ................................ 464/30

*Primary Examiner*—Daniel P. Stodola
*Attorney, Agent, or Firm*—Charles W. Chandler

[57] ABSTRACT

A powered conveyor roller having a frictional coupling inside the roller drivingly connecting the roller to a drive shaft extending actually through the roller. The coupling includes a flat spring wrapped around the shaft to form a frictional engagement with a pair of split bushings disposed on the shaft and inside the spring, the opposite end of the spring being connected to the roller in such a manner that the roller is driven by the shaft up to a predetermined load on the roller but the shaft and roller rotate with respect to one another when the load exceeds a predetermined, adjusted level.

9 Claims, 1 Drawing Sheet

POWER ROLL CONVEYOR WITH ADJUSTABLE TORQUE SENSITIVE COUPLING

BACKGROUND OF THE INVENTION

This invention is related to powered conveyor rollers in which a coupling or clutch is connected between the roller shaft and the roller housing, in such a manner that if the roller housing should be held stationary by a restraining torque, the shaft can continue to rotate; and more particularly to a powered roller in which a flat spring is wrapped around the shaft in the roller housing to form a torque sensitive coupling for driving the roller. A pair of expandible bushings inside the spring form an adjustable frictional engagement between the shaft and the roller.

Powered conveyor rollers are commonly used in industry such as on a conveyor line, where certain rollers are normally driven by an axially extending shaft in the roller housing to move a workpiece along the conveyor. However, under certain circumstances, the load imposed on the roller by the workpiece, such as when the workpiece is being restrained by some exterior device, causes the roller to remain temporarily stationary, while the drive shaft continues to rotate.

Prior art related to this problem include U.S. Pat. No. 3,567,010, which issued to Hans Vom Stein on Mar. 2, 1971, discloses a roller having a load-bearing shell which when engaged by a certain load permits rotation between the roller case and the shaft.

U.S. Pat. No. 3,942,228 which issued Mar. 9, 1976, and U.S. Pat. No. 4,056,953 which issued Nov. 8, 1977 both to James L. Furlette, et al, show a driven roller in which the drive shaft has a polygonal cross-section and resilient means, either in the form of balls or a resilient tube, which cooperate to form an overload clutch.

SUMMARY OF THE INVENTION

The preferred embodiment of the invention comprises a powered conveyor roller which includes a cylindrical roll mounted on an axially extending shaft having its ends journaled in a suitable frame. A pair of split bushings are mounted on the shaft inside the roll. The shaft has an axial bore having one end terminating at the outer end of the shaft, and its inner end inside the roller. A pair of openings extend radially from the bore to the position of the split bushings. Each bushing has a pin extending through its neighboring opening.

An elongated adjustment member is threadably mounted in the bore. A knob is carried on the outer end of the adjustment member. The inner end of the adjustment member is tapered and disposed between the two pins. When the adjustment member is rotated in one direction, the tapered end urges the bushings outwardly to increase their combined diameter, and when the adjustment member is rotated in the opposite direction, the bushings can be moved toward the shaft so their combined diameter is reduced.

A flat spring member has a partially circular end wrapped around the split bushings to form a frictional engagement between the spring and the bushings. The opposite end of the spring is connected to the roll so that the spring at all times rotates with the roll while the bushings at all times rotate with the shaft. The frictional engagement between the spring and the split bushings is adjusted such that at a predetermined torque, the roller can rotate independently of the shaft, while at a lesser torque the shaft drives the roller. The arrangement is such that by manipulating the adjustment knob, the "slip point" between the bushings and the spring coupling can be very finely adjusted.

Still further objects and advantages of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which.

DESCRIPTION OF THE PREFERRED EMBODIMENT

Figure 1:
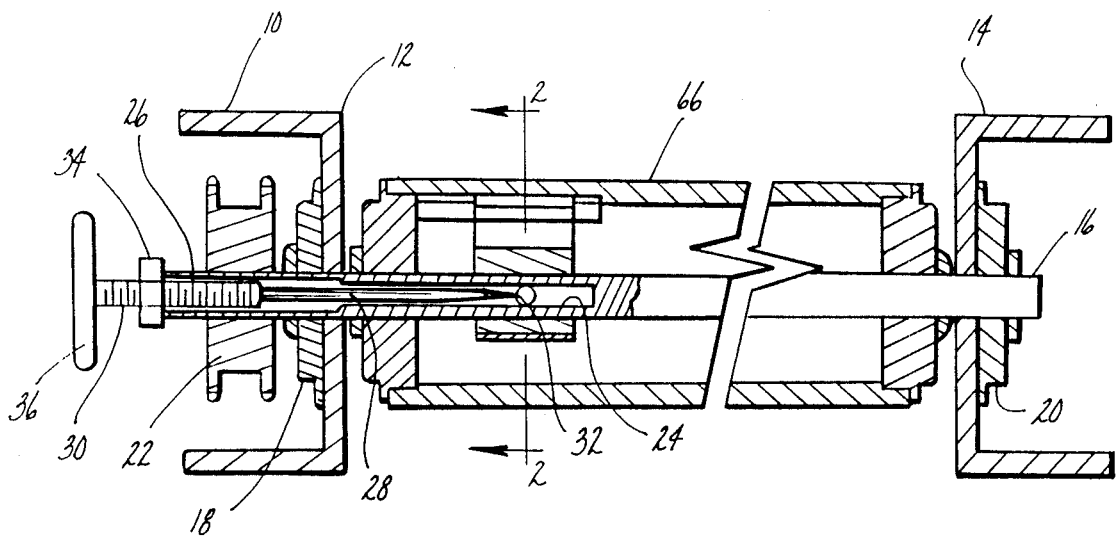
FIG. 1 is a sectional view through a conveyor frame and roll illustrating the preferred embodiment of the invention.

Referring to the drawing, FIG. 1 illustrates conveyor frame 10 having a pair of spaced parallel frame channels 12 and 14. An elongated drive shaft 16 is supported by bearing means 18 and 20, mounted on channels 12 and 14, respectively. A drive sprocket 22 is mounted on one end of the shaft and connected to rotary drive means not shown.

The drive shaft has an internal longitudinal bore 24. The outer end of the bore is internally threaded at 26. An elongated adjustment member 28 is mounted in the bore. The outer end of the adjustment member 28 is threaded at 30 so as to be threadably engaged with the internally threaded portion of shaft 16. The inner end of the adjustment member is tapered at 32. The location of the tapered end can be adjusted by rotating the adjustment member so as to move the adjustment member longitudinally. A lock nut 34 provides means for locking the adjustment member in an adjusted position. Knob 36 is attached to the outer end of the adjustment member.

Figure 2:
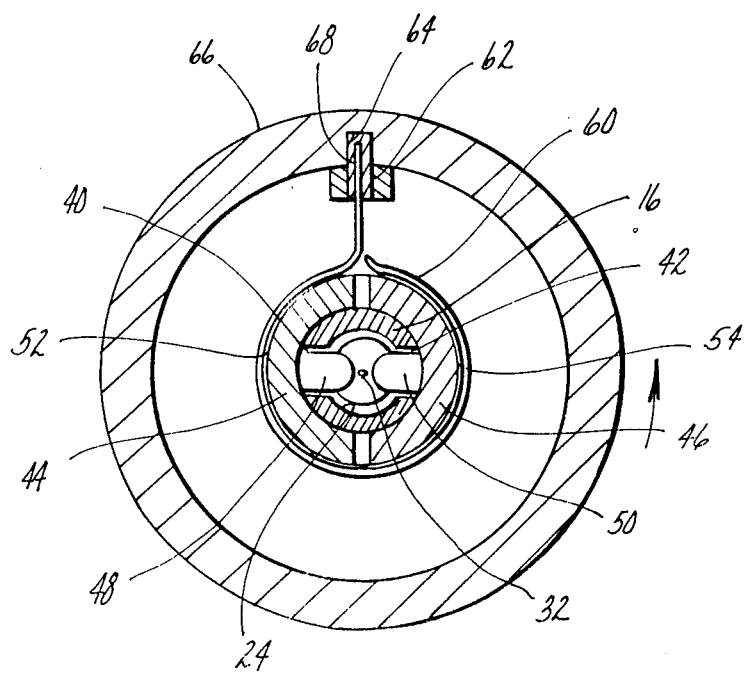
FIG. 2 is an enlarged view substantially as seen along lines 2—2 of FIG. 1.

Referring to FIG. 2, shaft 16 has a pair of openings 40 and 42 disposed adjacent the tapered end of the adjustment member. A pair of split bushings 44 and 46 are mounted on the shaft. Bushing 44 has a pin 48 disposed in opening 40 while bushing 46 has a pin 50 extending through opening 42. The arrangement is such that the adjustment member tapered end engages the inner rounded end of the two pins. By moving the tapered end in one direction, the split bushings move outwardly to increase their combined outside diameter. Rotating the adjustment member to move it in the opposite direction reduces the combined diameter of the split bushings. Split bushing 44 has an outer partially cylindrical frictional surface 52. The other bushing 46 has an outer partially cylindrical frictional surface 54.

A flat, resilient spring coupling member 60 has one end wrapped around a substantial portion of the two bushings to form a frictional engagement with the frictional surfaces of the bushings. A retainer 62, received in slot 64 of a cylindrical load-bearing tubular roller 66, receives the outer end 68 of the spring member. The roll has a pair of end caps mounted on shaft 16 which is supported on the longitudinal axis of the roll.

The arrangement is such that the drive shaft extends along the longitudinal axis of cylindrical roller 66. Roll 66 rotates at all times with the spring member while the two bushings rotate at all times with the drive shaft.

The drive shaft normally rotates the roll through the coupling member 60. When the torque applied on roll 66 exceeds a predetermined level such that the frictional engagement between the spring and the bushings reaches a slip point, the two bushings slidingly engage the inside of the spring coupling. Thus the shaft can continue to rotate with the drive sprocket.

If a workpiece engages roll 66, and either the motion of the workpiece is restrained or the torque applied by the roll on the shaft exceeds a predetermined level, the roll will either slow down or remain stationary while the drive shaft continues to rotate.

Having described invention, I claim:

1. In combination, a hollow tubular conveyor roller; a drive shaft extending through said roller on the roller axis;
   and a frictional drive-transmitting coupling between the shaft and the inner surface of the tubular roller;
   said coupling comprising a circular torquetransmitting leaf spring anchored to the inner surface of the roller in surrounding relation to the shaft, and circular drive bushings carried on the shaft in the space circumscribed by the leaf spring;
   said bushings having arcuate drive surfaces conforming to the curvature of the leaf spring inner surface to maximize the contact area between the drive bushings and the leaf spring.

2. The combination of claim 1 wherein there are two semicylindrical drive bushings carried on the shaft, and the leaf spring extends substantially completely around the two drive bushings.

3. The combination of claim 1, and further comprising means for adjusting the drive bushings toward or away from the shaft axis to thereby adjust the frictional engagement force between the bushings and the leaf spring.

4. The combination of claim 3, wherein the shaft is hollow and the adjusting means includes an elongated adjustment member extending within the shaft to a point beyond the associated end of the roller, whereby the adjusting means is actuable without disturbing the shaft-roller relationship.

5. The combination of claim 4, wherein the elongated adjustment member and the shaft are threadably engaged, whereby the adjustment member can be rotated to advance itself along the shaft.

6. The combination of claim 1, and further comprisng means for adjusting the drive bushings toward or away from the shaft axis to thereby adjust the frictional engagement force between the bushings and the leaf spring; said adjusting means comprising an elongated adjustment member movable axially within the shaft, and radially-extending pins extending from the drive bushings into the shaft for engagement with said adjustment member; said adjustment member having a tapered side surface that is engageable with said pins to move said bushings toward or away from the shaft axis.

7. The combination of claim 6 wherein the tapered side surface of the elongated adjustment member has a conical surface contour, and the inner ends of the pins have spherical contours.

8. The combination of claim 6 wherein the elongated adjustment member has threaded engagement with the shaft, whereby the shaft is rotated to achieve movement thereof along the shaft axis; the tapered side surface of the elongated adjustment member having a conical surface contour, and the inner ends of the pins having spherical contours.

9. In combination, a conveyor roller;
   drive means axially aligned with said roller for rotating said roller around the roller axis;
   and a frictional drive-transmitting coupling operatively connected between the drive means and roller;
   said coupling comprising a circular torquetransmitting leaf spring centered on the roller-drive means axis, a plural number of arcuate drive bushings located in the space circumscribed by the leaf spring; and means for adjusting the drive bushings toward or away from the roller-drive means axis to thereby adjust the frictional engagement force between the bushings and the leaf spring;
   said bushings having arcuate drive surfaces conforming to the leaf spring inner surface to maximize the contact area between the drive bushings and the leaf spring.

* * * * *